US011873902B2

(12) United States Patent
George et al.

(10) Patent No.: US 11,873,902 B2
(45) Date of Patent: Jan. 16, 2024

(54) DYNAMIC METAL SEAL

(71) Applicant: SAINT-GOBAIN PERFORMANCE PLASTICS CORPORATION

(72) Inventors: Douglas George, Trumbull, CT (US); Mark W. Armitage, Madison, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 10 days.

(21) Appl. No.: 17/337,515

(22) Filed: Jun. 3, 2021

(65) Prior Publication Data

US 2021/0381600 A1 Dec. 9, 2021

Related U.S. Application Data

(60) Provisional application No. 63/034,051, filed on Jun. 3, 2020.

(51) Int. Cl.
*F16J 15/32* (2016.01)
*F16J 15/3232* (2016.01)

(52) U.S. Cl.
CPC .................................. *F16J 15/3232* (2013.01)

(58) Field of Classification Search
CPC .......... F16J 15/3232; F16J 15/08; F16J 15/28; F16J 15/0806; F16J 15/0887; F16J 15/0893; F16J 15/0812
See application file for complete search history.

(56) References Cited

U.S. PATENT DOCUMENTS

| | | | | |
|---|---|---|---|---|
| 3,575,432 A | * | 4/1971 | Taylor | F16J 15/0893 277/626 |
| 3,595,588 A | * | 7/1971 | Rode | F16J 15/0887 277/650 |
| 3,751,048 A | * | 8/1973 | Rode | F16J 15/0887 277/649 |
| 3,797,836 A | * | 3/1974 | Halling | F16L 17/08 277/626 |
| 3,907,309 A | * | 9/1975 | Griffiths | F16J 15/3456 277/362 |
| 4,121,843 A | * | 10/1978 | Halling | F16J 15/0887 277/647 |

(Continued)

FOREIGN PATENT DOCUMENTS

| | | |
|---|---|---|
| CN | 100443783 C | 12/2008 |
| JP | 2005147317 A | 6/2005 |

(Continued)

OTHER PUBLICATIONS

International Search Report and Written Opinion for PCT/US2021/035577, dated Sep. 24, 2021, 11 pages.

*Primary Examiner* — Eugene G Byrd
*Assistant Examiner* — L. Susmitha Koneru
(74) *Attorney, Agent, or Firm* — Abel Schillinger, LLP; Ann Palma

(57) ABSTRACT

Systems and methods include providing an annular seal for an assembly. The seal includes a metallic annular body comprising an inner sealing leg having a first sealing lip, a second sealing lip, and a valley disposed between the first sealing lip and the second sealing lip. The valley contains a plating reserve, such that the plating thickness in the valley is greater than the plating thickness on the first sealing lip and the second sealing lip.

20 Claims, 4 Drawing Sheets

(56) References Cited

U.S. PATENT DOCUMENTS

| | | | | |
|---|---|---|---|---|
| 4,199,151 A * | 4/1980 | Bartos | | F16J 15/0887 |
| | | | | 277/362 |
| 4,602,888 A * | 7/1986 | Court | | F16L 23/20 |
| | | | | 277/645 |
| 4,759,555 A * | 7/1988 | Halling | | F16J 9/18 |
| | | | | 277/631 |
| 4,832,353 A * | 5/1989 | Nicholson | | F16L 23/18 |
| | | | | 277/910 |
| 5,240,263 A * | 8/1993 | Nicholson | | F16J 15/0893 |
| | | | | 219/137 R |
| 5,582,415 A * | 12/1996 | Yoshida | | F16J 15/0825 |
| | | | | 277/592 |
| 5,730,445 A * | 3/1998 | Swensen | | F16J 15/0887 |
| | | | | 277/626 |
| 5,938,208 A * | 8/1999 | Yoshida | | F16J 15/0825 |
| | | | | 277/592 |
| 6,073,938 A * | 6/2000 | Abe | | F16J 15/104 |
| | | | | 277/654 |
| 6,076,835 A * | 6/2000 | Ress | | F01D 11/005 |
| | | | | 277/637 |
| 6,237,921 B1 * | 5/2001 | Liotta | | F01D 11/005 |
| | | | | 277/630 |
| 6,299,178 B1 * | 10/2001 | Halling | | F16J 15/0887 |
| | | | | 277/654 |
| 6,325,392 B1 * | 12/2001 | Halling | | F16J 15/0887 |
| | | | | 277/654 |
| 6,968,615 B1 * | 11/2005 | More | | F16J 15/0887 |
| | | | | 29/454 |
| 7,025,360 B2 * | 4/2006 | Walker | | E21B 33/03 |
| | | | | 285/341 |
| 8,398,831 B2 | 3/2013 | Ghongadi et al. | | |
| 8,602,113 B2 | 12/2013 | Jin et al. | | |
| 8,857,583 B2 | 10/2014 | Miyasato et al. | | |
| 9,121,489 B1 * | 9/2015 | Tosa | | F16J 15/0887 |
| 9,435,266 B2 * | 9/2016 | Sutterfield | | F01D 25/28 |
| 9,534,689 B2 * | 1/2017 | Chen | | F16J 15/062 |
| 9,714,580 B2 * | 7/2017 | Slavens | | F16J 15/062 |
| 9,932,844 B2 * | 4/2018 | Sutterfield | | F01D 25/28 |
| 10,113,437 B2 * | 10/2018 | Davis | | F16J 15/0887 |
| 10,480,336 B2 * | 11/2019 | Sutterfield | | F02C 7/28 |
| 10,487,943 B2 * | 11/2019 | Davis | | F16J 15/0887 |
| 11,021,983 B2 * | 6/2021 | Davis | | F01D 25/246 |
| 2003/0127807 A1 * | 7/2003 | More | | F16J 15/0887 |
| | | | | 277/628 |
| 2004/0239053 A1 * | 12/2004 | Rowe | | F16J 15/0887 |
| | | | | 277/654 |
| 2005/0073114 A1 * | 4/2005 | Amos | | F23R 3/002 |
| | | | | 277/644 |
| 2006/0218787 A1 * | 10/2006 | More | | F16J 15/0887 |
| | | | | 29/888.3 |
| 2006/0237963 A1 * | 10/2006 | More | | F16J 15/0887 |
| | | | | 277/626 |
| 2007/0102888 A1 * | 5/2007 | Takahiro | | F16J 15/0887 |
| | | | | 277/603 |
| 2007/0138751 A1 * | 6/2007 | Iguchi | | F01D 11/005 |
| | | | | 277/644 |
| 2008/0073861 A1 * | 3/2008 | Iguchi | | F01D 11/005 |
| | | | | 277/644 |
| 2010/0072710 A1 * | 3/2010 | Morgan | | F01D 9/042 |
| | | | | 277/399 |
| 2010/0096811 A1 * | 4/2010 | Datta | | F16J 15/0887 |
| | | | | 204/474 |
| 2011/0227296 A1 * | 9/2011 | Baca | | F16J 15/028 |
| | | | | 277/626 |
| 2014/0265161 A1 * | 9/2014 | Sutterfield | | F01D 25/28 |
| | | | | 277/642 |
| 2016/0003078 A1 * | 1/2016 | Stevens | | F01D 11/005 |
| | | | | 277/650 |
| 2016/0115807 A1 * | 4/2016 | Davis | | F01D 11/005 |
| | | | | 277/592 |
| 2016/0258534 A1 | 9/2016 | Chen | | |
| 2016/0341056 A1 * | 11/2016 | Sutterfield | | F01D 11/003 |
| 2018/0100405 A1 * | 4/2018 | Sutterfield | | F01D 11/003 |
| 2018/0291759 A1 * | 10/2018 | Davis | | F01D 25/246 |
| 2020/0386320 A1 | 12/2020 | Lauer et al. | | |
| 2021/0131298 A1 * | 5/2021 | Ganiger | | F16J 15/0887 |

FOREIGN PATENT DOCUMENTS

| | | |
|---|---|---|
| JP | 2008069863 A | 3/2008 |
| JP | 2010196778 A | 9/2010 |
| JP | 2011144875 A | 7/2011 |
| WO | 2019121190 A1 | 6/2019 |
| WO | 2021247786 A1 | 12/2021 |

\* cited by examiner

DYNAMIC METAL SEAL

CROSS-REFERENCE TO RELATED APPLICATIONS

This application claims priority to and the benefit of U.S. Provisional Patent Application No. 63/034,051, filed on Jun. 3, 2020, by Douglas GEORGE, et al., entitled "DYNAMIC ROTARY METAL SEAL," the disclosure of which is assigned to the current assignee hereof and incorporated herein by reference in its entirety for all purposes.

BACKGROUND OF THE INVENTION

Seals are used in many industrial applications to prevent leakage between components of an assembly. In some applications, seals may be subjected to extreme operating conditions, such as extreme pressures or temperatures. To perform reliably under these extreme operating conditions, a seal stack having multiple seals stacked axially in an assembly may be used to provide redundancy in the seal. The seals in the seal stack may be sequentially pressurized, such that when an outermost pressurized seal wears and subsequently fails, the next seal becomes pressurized before wearing and eventually failing. Such seal stacks have relatively short life cycles, sometimes less than 200 cycles, and high economic costs due to the large footprints of the seal stacks and the requirement of large regions of each seal requiring precise machining and finishing for mating with components of the assembly. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
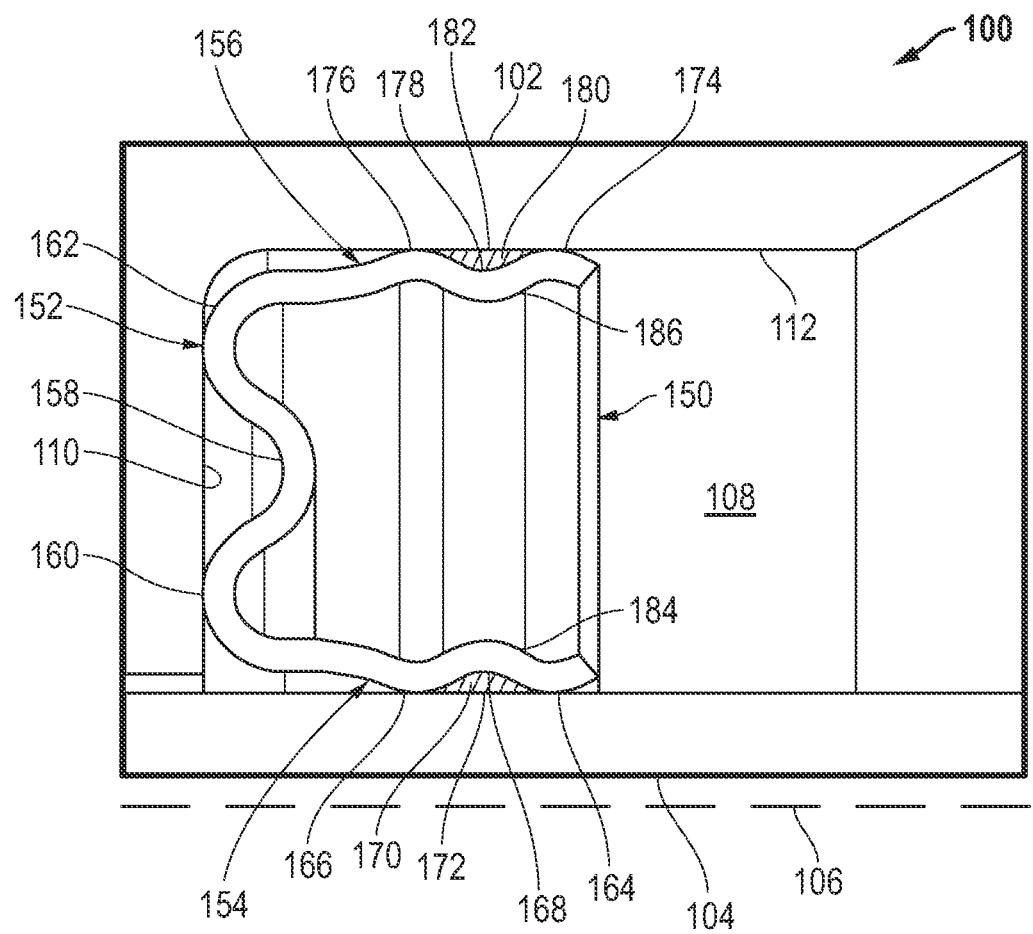
FIG. 1 is a partial cross-sectional view of an assembly having a seal according to an embodiment of the disclosure.

FIG. 1 shows a partial cross-sectional view of an assembly 100 having a seal 150 according to an embodiment of the disclosure. In some embodiments, the assembly 100 may be a valve assembly. In more specific embodiments, the assembly 100 may be a solenoid assembly. In a number of more specific embodiments, the assembly 100 may be a subsea valve, a subsea coupling, or subsea solenoid assembly. In other embodiments, the assembly 100 may comprise an automotive component assembly. In particular embodiments, the assembly 100 may comprise an automotive exhaust assembly. The assembly 100 may generally comprise a first component (e.g., housing or inner tube) 102 and a second component (e.g., shaft or outer tube) 104 that may rotate, oscillate, traverse, vibrate, remain stationary, or any combination thereof within the housing about an axis 106. The assembly 100 may further comprise a cavity 108 formed within the housing 102. In some embodiments, the housing 102 may comprise a radial inner surface 110 and an axial inner surface 112 that, along with the shaft 104, define the cavity 108.

An annular seal 150 may generally be disposed within the cavity 108 and about the shaft 104 and/or axis 106 of the assembly 100. In some embodiments, the seal 150 may comprise an interference fit between the axial inner surface 112 of the housing 102 and the shaft 104. The seal 200 may be configured to contact and provide a radial seal between the housing 102 and the shaft 104 of the assembly 100. The seal 150 may generally comprise a metallic annular body comprising an inner diameter (ID), an outer diameter (OD), a radial width (RW) defined as the difference between the ID and the OD of the seal 150, and an axial length (AL). In some embodiments, the seal 150 may comprise a substantially E-shaped cross-sectional profile having a center body portion 152, an inner sealing leg 154 extending from the center body portion 152, and an outer sealing leg 156 extending from the center body portion 156.

The center body portion 152 may be in contact with the radial inner surface 110 of the cavity 108 of the housing 102 of the assembly 100. In some embodiments, the center body portion 152 may comprise opposing arcuate convolutions comprising a center arcuate portion 158, an opposing inner arcuate portion 160 extending inwards from the center arcuate portion 158 towards the shaft 104, and an opposing outer arcuate portion 162 extending outwards from the center arcuate portion 158 towards the housing 102 of the assembly 100. In some embodiments, the inner arcuate portion 160 and the outer arcuate portion 162 may be in contact with the radial inner surface 110 of the cavity 108 of the housing 102 of the assembly 100. Further, in some embodiments, the center body portion 152 may comprise a plating.

The inner sealing leg 154 may generally extend inwards from the inner arcuate portion 160 of the central body portion 152 and towards the shaft 104 of the assembly 100. The inner sealing leg 154 may comprise a first sealing lip 164, a second sealing lip 166, and a valley 168 disposed between the first sealing lip 164 and the second sealing lip 166. In some embodiments, the first sealing lip 164 and the second sealing lip 166 may be disposed about the ID of the metallic annular body of the seal 150, such that the first sealing lip 164 and the second sealing lip 166 define the ID of the seal 150. As such, the first sealing lip 164 and the second sealing lip 166 may form ridges about the ID of the metallic annular body of the seal 150. The first sealing lip 164 and the second sealing lip 166 may be in contact with the shaft 104 to form a radial seal with the shaft 104. Additionally, in some embodiments, a plating may be disposed over the first sealing lip 164 and the second sealing lip 166.

The valley 168 may generally be disposed between first sealing lip 164 and the second sealing lip 166. The valley 168 may comprise an opposing arcuate convolution with respect to the first sealing lip 164 and the second sealing lip 166. In some embodiments, a plating may be disposed within the valley 168. In some embodiments, the valley 168 may comprise a plating thickness that is greater than the plating thickness on the first sealing lip 164 and the second sealing lip 166. As such, the seal 150 may comprise a variable plating thickness. In some embodiments, the valley 168 may comprise a plating reserve 170. In some embodiments, the plating reserve 170 may substantially fill the valley 168 to form a planar sealing surface 172. In some embodiments, the planar sealing surface 172 may be disposed about the ID of the metallic annular body of the seal 150, such that the planar sealing surface 172, along with the first sealing lip 164 and the second sealing lip 166, defines the ID of the seal 150. Collectively, the first sealing lip 164, the second sealing lip 166, and the planar sealing surface 172 may define a contact area about the ID of the seal 150. In some embodiments, the planar sealing surface 172 may be substantially parallel to the axis 106 of the shaft 104, orthogonal to the RW of the seal 150, or combinations thereof. Further, in some embodiments, the planar sealing surface 172 may be in contact with and form a radial seal with the shaft 104.

The outer sealing leg 156 may generally be substantially similar to the inner sealing leg 154. In some embodiments, the outer sealing leg 156 may be substantially symmetrical to the inner sealing leg 154. The outer sealing leg 156 may generally extend outwards from the outer arcuate portion 162 of the central body portion 152 and towards the housing 102 of the assembly 100. The outer sealing leg 156 may comprise a first sealing lip 174, a second sealing lip 176, and a valley 178 disposed between the first sealing lip 174 and the second sealing lip 176. In some embodiments, the first sealing lip 174 and the second sealing lip 176 may be disposed about the OD of the metallic annular body of the seal 150, such that the first sealing lip 174 and the second sealing lip 176 define the OD of the seal 150. As such, the first sealing lip 174 and the second sealing lip 176 may form ridges about the OD of the metallic annular body of the seal 150. The first sealing lip 174 and the second sealing lip 176 may be in contact with the axial inner surface 112 of the housing 102 to form a radial seal with the housing 102. Additionally, in some embodiments, a plating may be disposed over the first sealing lip 174 and the second sealing lip 176.

The valley 178 may generally be disposed between first sealing lip 174 and the second sealing lip 176. The valley 178 may comprise an opposing arcuate convolution with respect to the first sealing lip 174 and the second sealing lip 176. In some embodiments, a plating may be disposed within the valley 178. In some embodiments, the valley 178 may comprise a plating thickness that is greater than the plating thickness on the first sealing lip 174 and the second sealing lip 176. As such, the seal 150 may comprise a variable plating thickness. In some embodiments, the valley 178 may comprise a plating reserve 180. In some embodiments, the plating reserve 180 may substantially fill the valley 178 to form a planar sealing surface 182. In some embodiments, the planar sealing surface 182 may be disposed about the OD of the metallic annular body of the seal 150, such that the planar sealing surface 182, along with the first sealing lip 174 and the second sealing lip 176, defines the OD of the seal 150. Collectively, the first sealing lip 174, the second sealing lip 176, and the planar sealing surface 182 may define a contact area about the OD of the seal 150. In some embodiments, the planar sealing surface 182 may be substantially parallel to an axial inner surface 112 of the housing 102, orthogonal to the RW of the seal 150, or combinations thereof. Further, in some embodiments, the planar sealing surface 182 may be in contact with and form a radial seal with the axial inner surface 112 of the housing 102.

The metallic annular body of the seal 150 may generally be formed from a resilient metallic material. More specifically, the metallic annular body of the seal 150 may be formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, or bronze. In some embodiments, the metallic annular body of the seal 150 may comprise a coating or plating. In some embodiments, the first sealing lips 164, 174 and the second sealing lips 166, 176 of the metallic annular body of the seal 150 may comprise a substantially similar plating as the plating reserves 170, 180 of the seal 150. In some embodiments, the first sealing lips 164, 174 and the second sealing lips 166, 176 of the metallic annular body of the seal 150 may comprise a coating or plating formed from a different material than the plating reserves 170, 180 of the seal 150. More specifically, in some embodiments, the coating or plating may comprise a gold plating, a silver plating, an aluminum chromium nitride (AlCrN) plating, a titanium aluminum nitride (TiAlN) plating, any other wear resistant metallic plating, or any combination thereof. Further, in some embodiments, some portions of the metallic annular body of the seal 150 may not comprise the coating or plating. For example, in some embodiments, the sealing lips 164, 166, 174, 176 may be free of a plating, such that plating only exists in the valleys 158, 168 to form the plating reserves 170, 180 and planar sealing surfaces 172, 182.

In some embodiments, the plating reserves 170, 180 that may substantially fill the valleys 168, 178 to form the planar sealing surfaces 172, 182 may comprise an injection molded or compression molded polymer. In some embodiments, the polymer may be a fluoropolymer, a perfluoropolymer, PTFE, PVF, PVDF, PCTFE, PFA, FEP, ETFE, ECTFE, PCTFE, a fluorinated copolymer, a polyarylketone such as PEEK, PK, PEK, PEKK, PEKEKK, a polysulfone such as PPS, PPSU, PSU, a polyether such as PPE, or PPO, an aromatic polyamide such as PPA or an aliphatic polyamide such as PA, a thermoplastic polyimide such as PEI or TPI, a thermoplastic elastomer such as TPE, a thermoplastic vulcanizate such as TPV, a thermoplastic olefin such as TPO, Teflon, or any other polymer. In some embodiments, the polymer may comprise one or more fillers. In some embodiments, the filler may comprise carbon, graphite, graphene, mica, vermiculite, titanium dioxide ($TiO_2$), molybdenum disulfide ($MoS_2$), tungsten disulfide ($WS_2$), barium sulfate ($BaSO_4$), talc, mica, boron nitride (BN), aromatic polyester, an inorganic filler, a combination thereof, or any other suitable filler. In some embodiments, the filler may be configured to provide joint lubrication. In some embodiments, the filler may be configured to expand after the polymer wears or decays to fill voids left by the thermally worn or decayed polymer, thereby continuing to provide an effective fluid tight seal.

Collectively, the first sealing lip 164, the second sealing lip 166, and the planar sealing surface 172 of the inner sealing leg 154 may define a contact area about the ID of the seal 150, while the first sealing lip 174, the second sealing lip 176, and the planar sealing surface 182 of the outer sealing leg 156 may define a contact area about the OD of the seal 150. The sealing lips 164, 166 may provide redundancy of the radial seal between the shaft 104 and the inner sealing leg 154, while the sealing lips 174, 176 may provide redundancy of the radial seal between the housing 102 and the outer sealing leg 156. Additionally, in some embodiments, the greater plating thickness in the valleys 168, 178, which forms the planar sealing surfaces 172, 182, may also provide redundancy of the radial seal between the housing 102 and the shaft 104.

In operation, the plating on the sealing lips 164, 166, 174, 176 (or the sealing lips 164, 166, 174, 176 in embodiments having unplated sealing lips) may wear due to friction between the components 102, 104 of the assembly 100 and the seal 150. The plating reserves 170, 180 may also wear in conjunction with the plating on the sealing lips 164, 166, 174, 176 (or the sealing lips 164, 166, 174, 176 in embodiments having unplated sealing lips), thereby exposing new plating material in the plating reserves 170, 180. Where traditional seals may fail when such seals experience significant wear, the plating reserve 170, 180 in the valleys 168, 178 that forms the planar sealing surfaces 172, 182 may continually provide a radial seal between the housing 102 and the shaft 104. Accordingly, in some embodiments, the plating reserves 170, 180 may extend the life of the seal 150 and/or may prevent catastrophic failure of the seal 150 in the assembly 100.

In some embodiments, the plating thicknesses at the first sealing lips 164, 174, the second sealing lips 166, 176, and/or the valleys 168, 178 that form the plating reserves 170, 180 in the valleys 168, 178 that forms the planar sealing surfaces 172, 182 may comprise a beneficial thickness that may extend the life the of the seal 150 and/or prevent catastrophic failure of the seal 150 in the assembly 100. In some embodiments, the plating thickness at the first sealing lip 164, 174 and the second sealing lip 166, 176 of the first sealing leg 154 and/or the second sealing leg 156 may be at least 0.0005 mm, at least 0.005 mm, at least 0.01 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm. In some embodiments, the plating thickness at the first sealing lip 164, 174 and the second sealing lip 166, 176 of the first sealing leg 154 and/or the second sealing leg 156 may be not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, not greater than 0.25 mm, or not greater than 0.015 mm. Further, it will be appreciated that the plating thickness at the first sealing lip 164, 174 and the second sealing lip 166, 176 of the first sealing leg 154 and/or the second sealing leg 156 may be between any of these minimum and maximum values, such as at least 0.0005 mm to not greater than 1.0 mm, or even at least 0.005 mm to not greater than 0.015 mm.

In some embodiments, the plating thickness at the valleys 168, 178 of the first sealing leg 154 and/or the second sealing leg 156 may be at least 0.005 mm, at least 0.01 mm, at least 0.015 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm. In some embodiments, the plating thickness at the valleys 168, 178 of the first sealing leg 154 and/or the second sealing leg 156 may be not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, not greater than 0.25 mm, not greater than 0.05 mm, or not greater than 0.025 mm. Further, it will be appreciated that the plating thickness at the valleys 168, 178 of the first sealing leg 154 and/or the second sealing leg 156 may be between any of these minimum and maximum values, such as at least 0.005 mm to not greater than 1.0 mm, or even at least 0.015 mm to not greater than 0.05 mm.

In some embodiments, the plating thickness at the valleys 168, 178 of the first sealing leg 154 and/or the second sealing leg 156 may be at least 1.05, at least 1.10, at least 1.15, at least 1.25, at least 1.5, at least 1.75, at least 2.0, at least 2.5, or at least 3.0 times thicker than the plating thickness at the first sealing lip 164, 174 and the second sealing lip 166, 176 of the first sealing leg 154 and/or the second sealing leg 156. In some embodiments, the plating thickness at the valleys 168, 178 of the first sealing leg 154 and/or the second sealing leg 156 may be not greater than 10.0, not greater than 9.0, not greater than 8.0, not greater than 7.0, not greater than 6.0, not greater than 5.0, not greater than 4.5, not greater than 4.0, not greater than 3.5, or not greater than 3 times thicker than the plating thickness at the first sealing lip 164, 174 and the second sealing lip 166, 176 of the first sealing leg 154 and/or the second sealing leg 156. Further, the plating thickness at the valleys 168, 178 of the first sealing leg 154 and/or the second sealing leg 156 may be between any of these minimum and maximum values, such as at least 1.05 to not greater than 10, or even at least 1.25 to not greater than 3 times thicker than the plating thickness at the first sealing lip 164, 174 and the second sealing lip 166, 176 of the first sealing leg 154 and/or the second sealing leg 156.

In some exemplary embodiments, the first sealing lip 164, 174 and the second sealing lip 166, 176 of the first sealing leg 154 and/or the second sealing leg 156 may not comprise a plating thickness, while the plating thickness at the valleys 168, 178 of the first sealing leg 154 and/or the second sealing leg 156 may be 0.0762 mm. In some exemplary embodiments, the plating thickness at the first sealing lip 164, 174 and the second sealing lip 166, 176 of the first sealing leg 154 and/or the second sealing leg 156 may be 0.0381 mm, while the plating thickness at the valleys 168, 178 of the first sealing leg 154 and/or the second sealing leg 156 may be 0.0762 mm. In other exemplary embodiments, the plating thickness at the first sealing lip 164, 174 and the second sealing lip 166, 176 of the first sealing leg 154 and/or the second sealing leg 156 may be 0.0381 mm, while the plating thickness at the valleys 168, 178 of the first sealing leg 154 and/or the second sealing leg 156 may be 0.1143 mm.

In some embodiments, the seal 150 may be optimized for a particular assembly 100. In some embodiments, the contact length (CL) along an axial direction of the seal 150 may be proportional to the torque specifications of the shaft 104 of the assembly 100. Accordingly, in some embodiments, the planar sealing surface 172, 182 of the inner sealing leg 154 and/or the outer sealing leg 156 may comprise a CL that is at least 1%, at least 2%, at least 3%, at least 4%, at least 5%, at least 10%, at least 15%, at least 20%, or at least 25% of an axial length (AL) of the metallic annular body of the seal 150. In some embodiments, the planar sealing surface 172, 182 of the inner sealing leg 154 and/or the outer sealing leg 156 may comprise a CL that is not greater than 95%, not greater than 90%, not greater than 85%, not greater than 80%, not greater than 75%, not greater than 50%, or not greater than 25% of the AL of the metallic annular body of the seal 150. Further, it will be appreciated that the planar sealing surface 172, 182 of the inner sealing leg 154 and/or the outer sealing leg 156 may comprise a CL that is between any of these minimum and maximum values, such as at least 1% to not greater than 95%, or even at least 5% to not greater than 25% of the AL of the metallic annular body of the seal 150.

Figure 2:
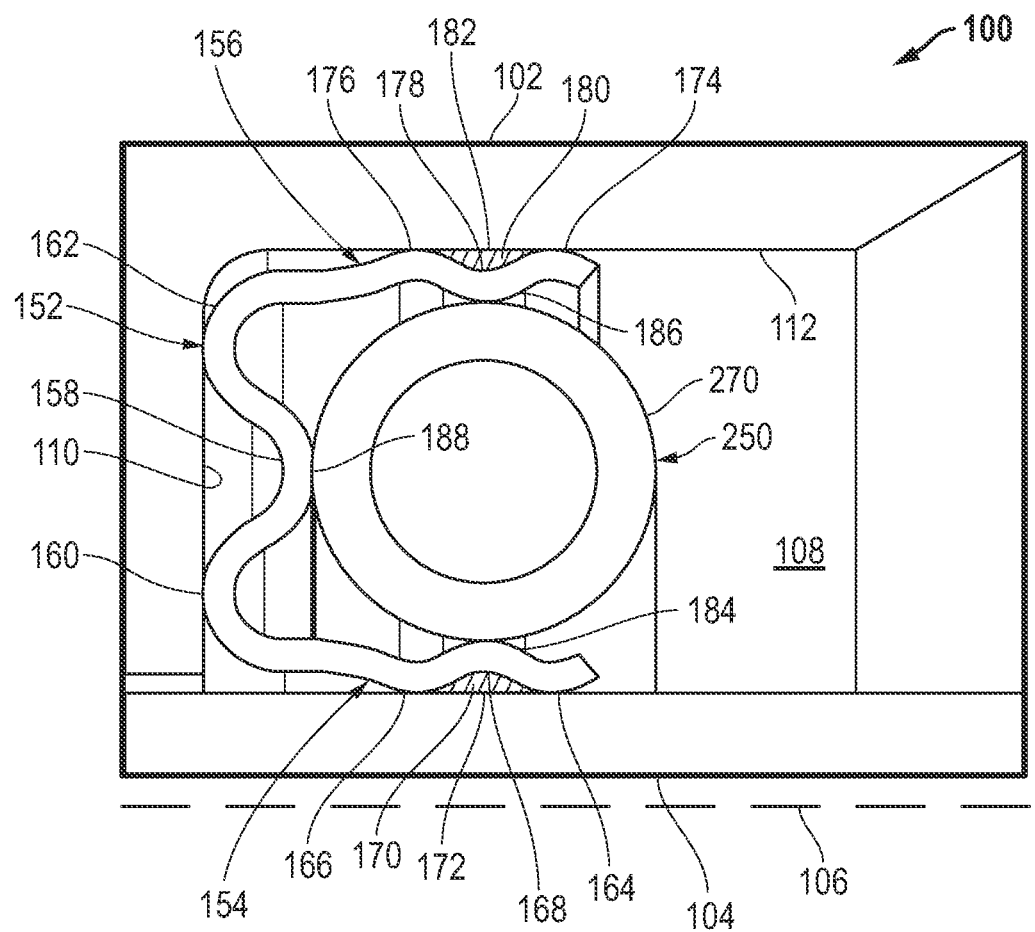
FIG. 2 is a partial cross-sectional view of an assembly having a seal according to another embodiment of the disclosure.

FIG. 2 shows a partial cross-sectional view of an assembly 100 having a seal 250 according to another embodiment of the disclosure. In some embodiments, the seal 250 may be substantially similar to seal 150. However, seal 250 may comprise an annular energizing element 270. The energizing element 270 may be disposed between the valleys 168, 178 and in contact with inner surfaces 184, 186 of the valleys 168, 178 of each of the first sealing leg 154, and/or the second sealing leg 156. In some embodiments, the energizing element 270 may also be in contact with an inner surface 188 of the center arcuate portion 158 of the center body portion 152 of the seal 150. Accordingly, in some embodiments, the energizing element 270 may be configured to bias the inner sealing leg 152 and the outer sealing leg 154 away from each other. In some embodiments, the energizing element 270 may comprise a circular profile. However, in other embodiments, the energizing element 270 may comprise another profile, such as an oval-shaped profile, a U-shaped profile, a V-shaped profile, a C-shaped profile, or any other shaped profile. In some embodiments, the energizing element 270 may comprise a single layer of material. However, in other embodiments, the energizing element 270 may comprise multiple layers or plies of material. Suitable materials for the energizing element 270 may include, for example, a nickel-chromium based alloy such as Inconel®, a nickel-based alloy, nickel, titanium, tungsten, stainless steel, spring steel, steel, aluminum, zinc, copper, magnesium, tin, platinum, lead, iron, bronze, other resilient metallic materials, or any combination thereof.

Figure 3:
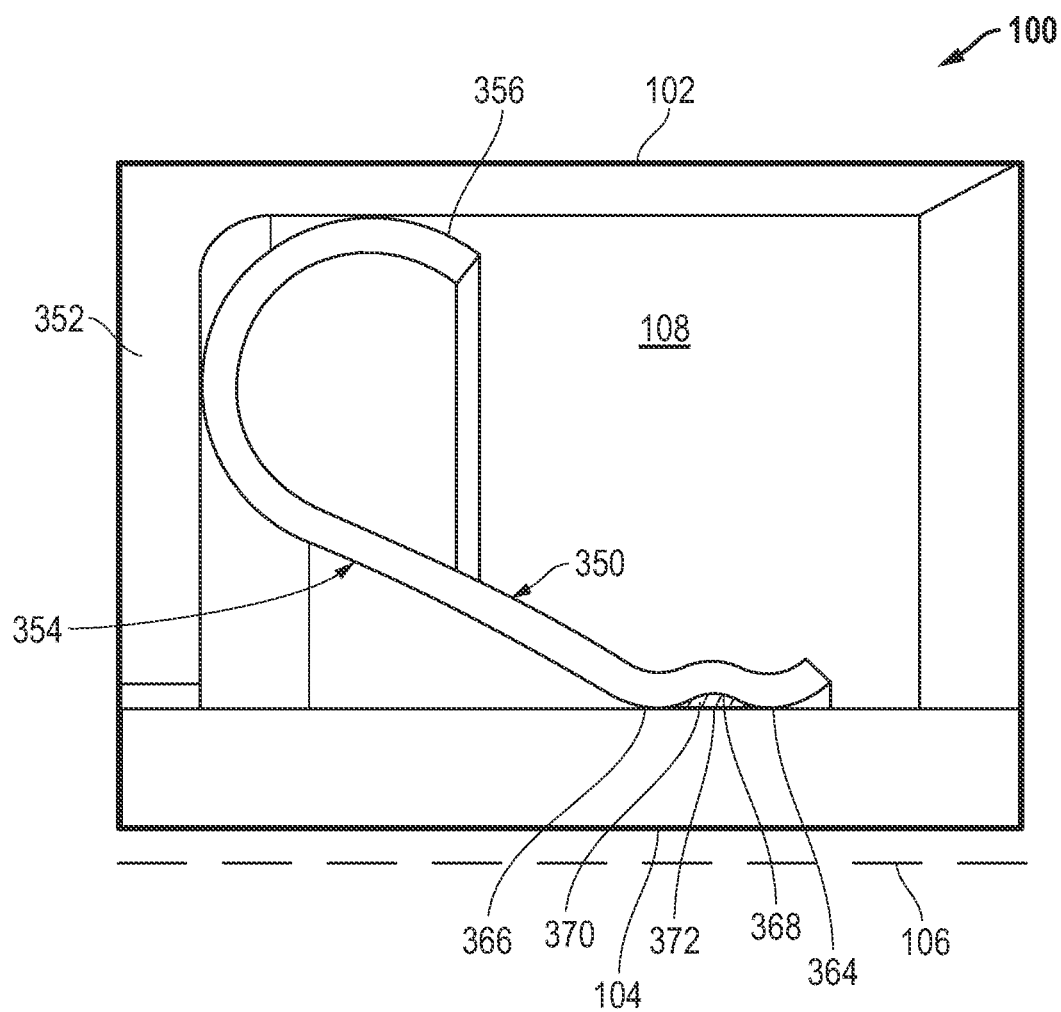
FIG. 3 is a partial cross-sectional view of an assembly having a seal according to another embodiment of the disclosure.

FIG. 3 is a partial cross-sectional view of an assembly 100 having a seal 350 according to another embodiment of the disclosure. In some embodiments, the seal 350 may be substantially similar to seal 150. The seal 350 comprises a center body portion 352, an inner sealing leg 354 extending from the center body portion 352, and an outer sealing leg 356 extending from the center body portion 352. The inner sealing leg 354 may comprise a first sealing lip 364, a second sealing lip 366, and a valley 368 disposed between the first sealing lip 364 and the second sealing lip 366. In some embodiments, a plating may be disposed within the valley 368 in accordance with embodiments disclosed herein. In some embodiments, the valley 368 may comprise a plating thickness that is greater than the plating thickness on the first sealing lip 364 and the second sealing lip 366. As such, the seal 350 may comprise a variable plating thickness. In some embodiments, the valley 368 may comprise a plating reserve 370 in accordance with embodiments disclosed herein. In some embodiments, the plating reserve 370 may substantially fill the valley 368 to form a planar sealing surface 372. However, as opposed to the substantially E-shaped cross-sectional profile of the seal 150, the seal 350 may comprise a substantially C-shaped or J-shaped cross-sectional profile. As such, in some embodiments, the central body portion 352 of the seal 350 may be arcuate. Additionally, in some embodiments, the outer sealing leg 356 may also be arcuate. Further, in alternative embodiments, the inner sealing leg 354 and the outer sealing leg 356 may be reversed, such that the inner sealing leg 354 may be arcuate, and the outer sealing leg 356 comprises the first sealing lip 364, the second sealing lip 366, and the valley 368 disposed between the first sealing lip 364 and the second sealing lip 366.

Figure 4:
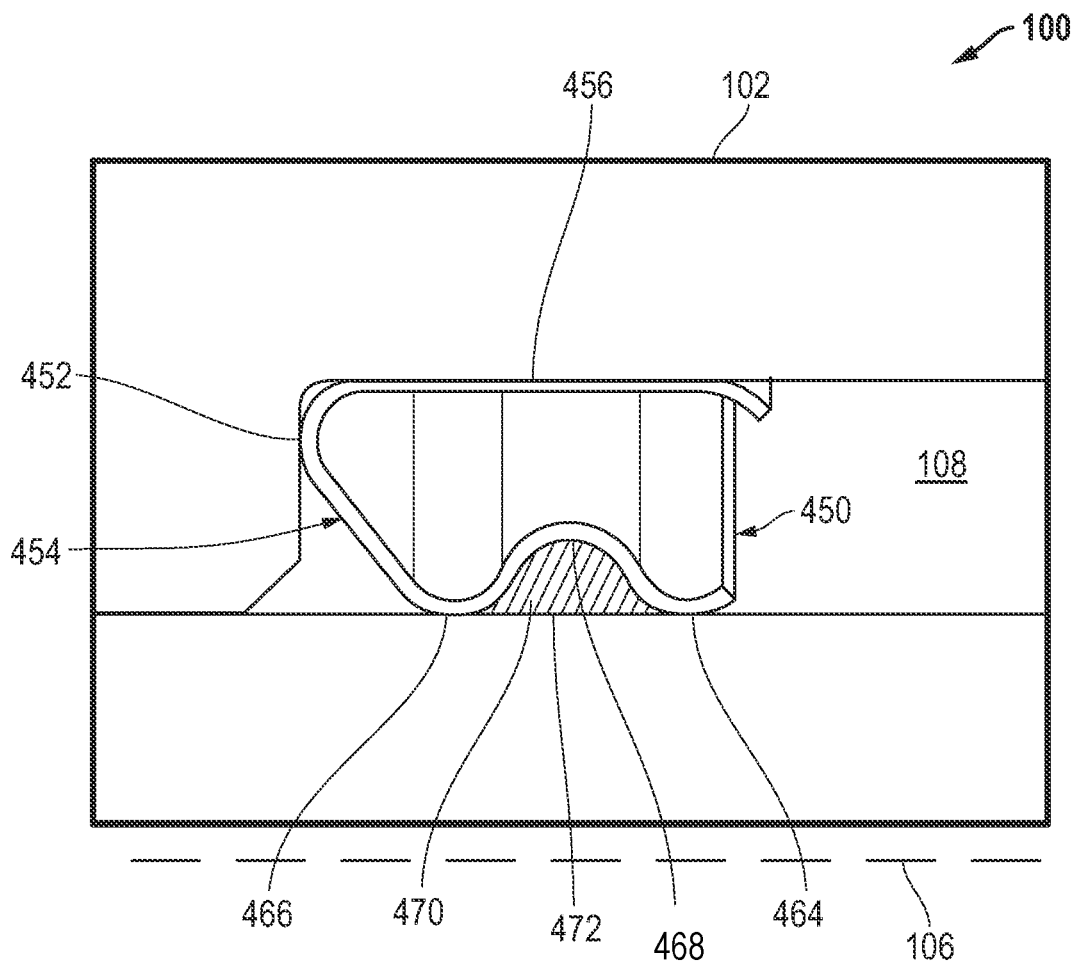
FIG. 4 is a partial cross-sectional view of an assembly having a seal according to another embodiment of the disclosure.

FIG. 4 is a partial cross-sectional view of an assembly 100 having a seal 450 according to another embodiment of the disclosure. In some embodiments, the seal 450 may be substantially similar to seal 150. The seal 450 comprises a center body portion 452, an inner sealing leg 454 extending from the center body portion 452, and an outer sealing leg 456 extending from the center body portion 452. The inner sealing leg 454 may comprise a first sealing lip 464, a second sealing lip 466, and a valley 468 disposed between the first sealing lip 464 and the second sealing lip 466. In some embodiments, a plating may be disposed within the valley 468 in accordance with embodiments disclosed herein. In some embodiments, the valley 468 may comprise a plating thickness that is greater than the plating thickness on the first sealing lip 464 and the second sealing lip 466. As such, the seal 450 may comprise a variable plating thickness. In some embodiments, the valley 468 may comprise a plating reserve 470 in accordance with embodiments disclosed herein. In some embodiments, the plating reserve 470 may substantially fill the valley 468 to form a planar sealing surface 472. However, as opposed to the substantially E-shaped cross-sectional profile of the seal 150, the central body portion 452 of the seal 450 may be arcuate, while the outer sealing leg 456 may be linear or planar such that the outer sealing leg 456 may be substantially parallel to the housing 102 and/or the shaft 104. Further, in alternative embodiments, the inner sealing leg 454 and the outer sealing leg 456 may be reversed, such that the inner sealing leg 454 may be linear or planar, and the outer sealing leg 456 comprises the first sealing lip 464, the second sealing lip 466, and the valley 468 disposed between the first sealing lip 464 and the second sealing lip 466.

Other embodiments of a seal 150, 250, 350, 450 may comprise a substantially U-shaped cross-sectional profile, a substantially D-shaped cross-sectional profile, a substantially parabolic-shaped cross-sectional profile, a substantially oval-shaped cross-sectional profile, or any other shaped cross-sectional profile. In some embodiments, it will be appreciated that the assembly 100 may comprise one or more seals 150, 250, 350, 450. In some embodiments, one or more of the sealing legs 154, 156, 354, 454 may comprise additional sealing lips 164, 166, 174, 176, 364, 366, 464, 466 to form a plurality of valleys 168, 178, 368, 468 in the seals 150, 250, 350, 450. The plurality of valleys 168, 178, 368, 468 may be configured in accordance with embodiments herein, such that each of the plurality of valleys 168, 178, 368, 468 comprises a plating reserve 170, 180, 370, 470 that form a plurality of planar sealing surfaces 172, 182, 372, 472 in one or more of the sealing legs 154, 156, 354, 454.

Embodiments of the seal 150, 250, 350, 450 may comprise any dimensions suitable for a particular application. In some embodiments, the inner diameter of the metallic annular body of the seal 150, 250, 350, 450 may be at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater. In some embodiments, the outer diameter of the metallic annular body of the seal 150, 250, 350, 450 may be at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Further, in some embodiments, embodiments of the seal 150, 250, 350, 450 may allow leakage of not greater than 0.25 cubic centimeters per minute (cc/min), not greater than 0.15 cc/min, not greater than 0.10 cc/min, not greater than 0.075 cc/min, not greater than 0.050 cc/min, not greater than 0.040 cc/min, not greater than 0.030 c/min, not greater than 0.025 cc/min, not greater than 0.020 cc/min, not greater than 0.015 cc/min, not greater than 0.010 cc/min, or not greater than 0.005 cc/min. In some embodiments, embodiments of the seal 150, 250, 350, 450 may allow these leakage numbers at a pressure of at least 5 pounds per square inch (psi) (34.47 kPa), at least 10 psi (68.94 kPa), at least 15 psi (103.42 kPa), at least 20 psi (137.89 kPa), at least 25 psi (172.36 kPa), at least 30 psi (206.84 kPa), or at least 35 psi (241.31 kPa). Further, in some embodiments, embodiments of the seal 150, 250, 350, 450 may allow these leakage numbers at the listed pressures at a minimum temperature of at least 15 degrees Celsius, at least 20 degrees Celsius, at least 25 degrees Celsius, at least 30 degrees Celsius, at least 35 degrees Celsius, at least 40 degrees Celsius, or at least 45 degrees Celsius. For example, one exemplary embodiment of a seal 150, 250, 350, 450 achieved a leakage rate of about 0.040 cc/min at 25 psi (172.36 kPa) at room temperature with a minimal interference between the seal 150, 250, 350, 450 and the components 102, 104 of an assembly 100 of 0.002 inches (0.050 mm).

Embodiments of an assembly 100 and/or a seal 150, 250, 350, 450 may include one or more of the following:

Embodiment 1. A seal, comprising: a metallic annular body comprising an inner sealing leg comprising a first sealing lip, a second sealing lip, and a valley disposed between the first sealing lip and the second sealing lip, wherein the valley comprises a plating reserve having a plating thickness that is greater than the plating thickness on the first sealing lip and the second sealing lip.

Embodiment 2. An assembly, comprising: a shaft having an axis; a housing comprising a cavity and disposed annularly about the shaft; and a seal disposed within the cavity and configured to provide a radial seal between the shaft and the housing, the seal comprising: a metallic annular body comprising an inner sealing leg in contact with the shaft, wherein the inner sealing leg comprises a first sealing lip, a second sealing lip, and a valley disposed between the first sealing lip and the second sealing lip, and wherein the valley comprises a plating reserve having a plating thickness that is greater than the plating thickness on the first sealing lip and the second sealing lip.

Embodiment 3. The seal or assembly of any of embodiments 1 to 2, wherein the metallic annular body comprises a central body portion.

Embodiment 4. The seal or assembly of embodiment 3, wherein the central body portion is arcuate.

Embodiment 5. The seal or assembly of embodiment 3, wherein the central body portion comprises a plurality of opposing arcuate convolutions.

Embodiment 6. The seal or assembly of any of embodiments 3 to 5, wherein the inner sealing leg extends from the central body portion.

Embodiment 7. The seal or assembly of any of embodiments 1 to 6, wherein the metallic annular body comprises an outer sealing leg.

Embodiment 8. The seal or assembly of embodiment 7, wherein the outer sealing leg extends from the central body portion.

Embodiment 9. The seal or assembly of any of embodiments 7 to 8, wherein the outer sealing leg is arcuate.

Embodiment 10. The seal or assembly of any of embodiments 7 to 8, wherein the outer sealing leg is linear or planar.

Embodiment 11. The seal or assembly of any of embodiments 7 to 9, wherein the outer sealing leg comprises a first sealing lip, a second sealing lip, and a valley disposed between the first sealing lip and the second sealing lip, wherein the valley comprises a plating thickness that is greater than the plating thickness on the at least two sealing lips.

Embodiment 12. The assembly of any of embodiments 7 to 11, wherein the outer sealing leg is in contact with the housing of the assembly.

Embodiment 13. The seal or assembly of any of embodiments 1 to 12, wherein the first sealing lip and the second sealing lip of the inner sealing leg are disposed about the inner diameter of the metallic annular body of the seal.

Embodiment 14. The seal or assembly of embodiment 13, wherein the first sealing lip and the second sealing lip of the inner sealing leg form ridges about the inner diameter of the metallic annular body of the seal.

Embodiment 15. The seal or assembly of any of embodiments 7 to 14, wherein the first sealing lip and the second sealing lip of the outer sealing leg are disposed about the outer diameter of the metallic annular body of the seal.

Embodiment 16. The seal or assembly of embodiment 15, wherein the first sealing lip and the second sealing lip of the outer sealing leg form ridges about the outer diameter of the metallic annular body of the seal.

Embodiment 17. The seal or assembly of any of embodiments 1 to 16, wherein the valley of the inner sealing leg is filled with plating to form a planar sealing surface.

Embodiment 18. The seal or assembly of embodiment 17, wherein the planar sealing surface of the inner sealing leg is substantially parallel to the axis of the shaft, orthogonal to a radial width of the seal, or combinations thereof.

Embodiment 19. The seal or assembly of embodiment 18, wherein the planar sealing surface of the inner sealing leg comprises an axial length that is at least 1%, at least 2%, at least 3%, at least 4%, at least 5%, at least 10%, at least 15%, at least 20%, or at least 25% of an axial length of the metallic annular body of the seal.

Embodiment 20. The seal or assembly of embodiment 19, wherein the planar sealing surface of the inner sealing leg comprises an axial length that is not greater than 95%, not greater than 90%, not greater than 85%, not greater than 80%, not greater than 75%, or not greater than 50% of the axial length of the metallic annular body of the seal.

Embodiment 21. The seal or assembly of any of embodiments 7 to 20, wherein the valley of the outer sealing leg is filled with plating to form a planar sealing surface.

Embodiment 22. The seal or assembly of embodiment 21, wherein the planar sealing surface of the outer sealing leg is substantially parallel to an axial inner surface of the housing, orthogonal to a radial width of the seal, or combinations thereof.

Embodiment 23. The seal or assembly of embodiment 22, wherein the planar sealing surface of the outer sealing leg comprises a contact length that is at least 1%, at least 2%, at least 3%, at least 4%, at least 5%, at least 10%, at least 15%, at least 20%, or at least 25% of an axial length of the metallic annular body of the seal.

Embodiment 24. The seal or assembly of embodiment 23, wherein the planar sealing surface of the outer sealing leg comprises a contact length that is not greater than 95%, not greater than 90%, not greater than 85%, not greater than 80%, not greater than 75%, not greater than 50%, or not greater than 25% of the axial length of the metallic annular body of the seal.

Embodiment 25. The seal or assembly of any of embodiments 1 to 24, wherein the plating thickness at the first sealing lip and the second sealing lip of the first sealing leg and/or the second sealing leg is at least 0.0005 mm, at least 0.005 mm, at least 0.01 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm.

Embodiment 26. The seal or assembly of any of embodiments 1 to 25, wherein the plating thickness at the first sealing lip and the second sealing lip of the first sealing leg and/or the second sealing leg is not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, or not greater than 0.25 mm.

Embodiment 27. The seal or assembly of any of embodiments 1 to 26, wherein the plating thickness at the valley of the first sealing leg and/or the second sealing leg is at least 0.005 mm, at least 0.01 mm, at least 0.015 mm, at least 0.02 mm, at least 0.025 mm, at least 0.03 mm, at least 0.04 mm, at least 0.05 mm, at least 0.10 mm, at least 0.15 mm, at least 0.20 mm, at least 0.25 mm, or at least 0.30 mm.

Embodiment 28. The seal or assembly of any of embodiments 1 to 27, wherein the plating thickness at the valley of the first sealing leg and/or the second sealing leg is not greater than 1.0 mm, not greater than 0.75 mm, not greater than 0.70 mm, not greater than 0.65 mm, not greater than 0.60 mm, not greater than 0.55 mm, not greater than 0.50 mm, not greater than 0.45 mm, not greater than 0.40 mm, not greater than 0.35 mm, not greater than 0.30 mm, or not greater than 0.25 mm, not greater than 0.05 mm, or not greater than 0.025 mm.

Embodiment 29. The seal or assembly of any of embodiments 1 to 28, wherein the plating thickness at the valley of the first sealing leg and/or the second sealing leg is at least 1.05, at least 1.10, at least 1.15, at least 1.25, at least 1.5, at least 1.75, at least 2.0, at least 2.5, or at least 3.0 times thicker than the plating thickness at the first sealing lip and the second sealing lip.

Embodiment 30. The seal or assembly of any of embodiments 1 to 29, wherein the plating thickness at the valley of the first sealing leg and/or the second sealing leg is not greater than 10.0, not greater than 9.0, not greater than 8.0, not greater than 7.0, not greater than 6.0, not greater than 5.0, not greater than 4.5, not greater than 4.0, or not greater than 3.5 times thicker than the plating thickness at the first sealing lip and the second sealing lip.

Embodiment 31. The seal or assembly of any of embodiments 7 to 30, further comprising: an energizing spring disposed between the inner sealing leg and the outer sealing leg.

Embodiment 32. The seal or assembly of embodiment 31, wherein the energizing spring is disposed between and in contact with an inner surface of the valley of the inner sealing leg and an inner surface of the valley of the outer sealing leg.

Embodiment 33. The seal or assembly of embodiment 32, wherein the energizing element is in contact with an inner surface of the center arcuate portion of the center body portion of the seal.

Embodiment 34. The seal or assembly of any of embodiments 31 to 33, wherein the energizing spring comprises a circular profile, an oval-shaped profile, a U-shaped profile, a V-shaped profile, or a C-shaped profile.

Embodiment 35. The seal or assembly of any of embodiments 31 to 34, wherein the energizing element is formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, bronze, other resilient metallic materials, or any combination thereof.

Embodiment 36. The seal or assembly of any of embodiments 1 to 35, wherein the inner diameter of the metallic annular body of the spring is at least 1 mm, at least 2 mm, at least 3 mm, at least 4 mm, at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater.

Embodiment 37. The seal or assembly of any of embodiments 1 to 36, wherein the outer diameter of the metallic annular body of the spring is at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, or even greater.

Embodiment 38. The seal or assembly of any of embodiments 1 to 37, wherein the metallic annular body is formed from a nickel-chromium based alloy such as Inconel®, a nickel-based alloy, nickel, titanium, tungsten, stainless steel, spring steel, steel, aluminum, zinc, copper, magnesium, tin, platinum, lead, iron, or bronze.

Embodiment 39. The seal or assembly of embodiment 38, wherein the first sealing lip and the second sealing lip of the metallic annular body comprises a gold plating, a silver plating, an aluminum chromium nitride (AlCrN) plating, or a titanium aluminum nitride (TiAlN) plating.

Embodiment 40. The seal or assembly of embodiment 38, wherein the first sealing lip and the second sealing lip of the metallic annular body are free of plating.

Embodiment 41. The seal or assembly of any of embodiments 38 to 40, wherein the plating reserve in the valley comprises a gold plating, a silver plating, an aluminum chromium nitride (AlCrN) plating, or a titanium aluminum nitride (TiAlN) plating.

Embodiment 42. The seal or assembly of any of embodiments 38 to 40, wherein the plating reserve in the valley comprises an injection molded or compression molded polymer.

Embodiment 43. The seal or assembly of embodiment 42, wherein the plating reserve in the valley comprises a fluoropolymer, a perfluoropolymer, PTFE, PVF, PVDF, PCTFE, PFA, FEP, ETFE, ECTFE, PCTFE, a fluorinated copolymer, a polyarylketone such as PEEK, PK, PEK, PEKK, PEKEKK, a polysulfone such as PPS, PPSU, PSU, a polyether such as PPE, or PPO, an aromatic polyamide such as PPA or an aliphatic polyamide such as PA, a thermoplastic polyimide such as PEI or TPI, a thermoplastic elastomer such as TPE, a thermoplastic vulcanizate such as TPV, a thermoplastic olefin such as TPO, Teflon, or a combination thereof.

Embodiment 44. The seal or assembly of embodiment 43, wherein the plating reserve comprises one or more fillers.

Embodiment 45. The seal or assembly of embodiment 44, wherein the one or more fillers comprise carbon, graphite, graphene, mica, vermiculite, titanium dioxide ($TiO_2$), molybdenum disulfide ($MoS_2$), tungsten disulfide ($WS_2$), barium sulfate ($BaSO_4$), talc, mica, boron nitride (BN), aromatic polyester, an inorganic filler, or a combination thereof.

Embodiment 46. The seal or assembly of embodiment 45, wherein the one or more fillers are configured to expand after the polymer wears or decays to fill voids left by the thermally worn or decayed polymer.

Embodiment 47. The seal or assembly of any of embodiments 1 to 46, wherein the inner sealing leg is configured to form a radial seal with a shaft of an assembly, and wherein the outer sealing leg is configured to form a radial seal with a housing of an assembly.

Embodiment 48. The assembly of any of embodiments 1 to 47, further comprising: a plurality of seals.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal, comprising:
a metallic annular body comprising an inner sealing leg comprising a first sealing lip, a second sealing lip, and a valley disposed between the first sealing lip and the second sealing lip, wherein the valley comprises a plating reserve having a plating thickness that is greater than the plating thickness on the first sealing lip and the second sealing lip, wherein the plating reserve substantially fills the valley to form a planar sealing surface, and the first sealing lip, the second sealing lip, and the planar sealing surface collectively define a contact area about inner diameter of the metallic annular body, wherein the inner sealing leg forms a radial seal with a component, and the contact area is substantially parallel to the component, wherein the valley comprises an opposite, inwardly projecting arcuate convolution with respect to the first sealing lip.

2. The seal of claim 1, wherein the metallic annular body comprises a central body portion, and wherein the inner sealing leg extends from the central body portion.

3. The seal of claim 2, wherein the central body portion is arcuate.

4. The seal of claim 3, wherein the metallic annular body comprises an outer sealing leg, and wherein the outer sealing leg extends from the central body portion.

5. The seal of claim 4, wherein the outer sealing leg is arcuate, linear, or planar, or a combination thereof.

6. The seal of claim 1, wherein the first sealing lip and the second sealing lip of the inner sealing leg form ridges about the inner diameter of the metallic annular body of the seal.

7. The seal of claim 1, wherein the planar sealing surface of the inner sealing leg is substantially parallel to the axis of the seal, orthogonal to a radial width of the seal, or combinations thereof.

8. The seal or assembly of claim 7, wherein the planar sealing surface of the inner sealing leg comprises an axial length that is at least 1%, at least 2%, at least 3%, at least 4%, at least 5%, at least 10%, at least 15%, at least 20%, or at least 25% of an axial length of the metallic annular body of the seal.

9. The seal or assembly of claim 8, wherein the planar sealing surface of the inner sealing leg comprises an axial length that is not greater than 95%, not greater than 90%, not greater than 85%, not greater than 80%, not greater than 75%, or not greater than 50% of the axial length of the metallic annular body of the seal.

10. The seal of claim 1, wherein the plating thickness at the valley of the first sealing leg and/or the second sealing leg is at least 1.05, at least 1.10, at least 1.15, at least 1.25, at least 1.5, at least 1.75, at least 2.0, at least 2.5, or at least 3.0 times thicker than the plating thickness at the first sealing lip and the second sealing lip.

11. The seal of claim 10, wherein the plating thickness at the valley of the first sealing leg and/or the second sealing leg is not greater than 10.0, not greater than 9.0, not greater than 8.0, not greater than 7.0, not greater than 6.0, not greater than 5.0, not greater than 4.5, not greater than 4.0, or not greater than 3.5 times thicker than the plating thickness at the first sealing lip and the second sealing lip.

12. The seal of claim 1, wherein the metallic annular body is formed from a nickel-chromium based alloy, a nickel-based alloy, nickel, titanium, tungsten, stainless steel, spring steel, steel, aluminum, zinc, copper, magnesium, tin, platinum, lead, iron, or bronze.

13. The seal of claim 12, wherein the first sealing lip and the second sealing lip of the metallic annular body comprises a gold plating, a silver plating, an aluminum chromium nitride (AlCrN) plating, or a titanium aluminum nitride (TiAlN) plating.

14. The seal of claim 12, wherein the first sealing lip and the second sealing lip of the metallic annular body are free of plating.

15. The seal of claim 1, wherein the plating reserve in the valley comprises a gold plating, a silver plating, an aluminum chromium nitride (AlCrN) plating, or a titanium aluminum nitride (TiAlN) plating.

16. The seal of claim 1, wherein the plating reserve in the valley comprises an injection molded or compression molded polymer.

17. The seal of claim 16, wherein the injection molded or compression molded polymer comprises a fluoropolymer, a perfluoropolymer, PTFE, PVF, PVDF, PCTFE, PFA, FEP, ETFE, ECTFE, PCTFE, a fluorinated copolymer, a polyarylketone, PK, PEK, PEKK, PEKEKK, a polysulfone, PPSU, PSU, a polyether, or PPO, an aromatic polyamide or an aliphatic polyamide, a thermoplastic polyimide, a thermoplastic elastomer, a thermoplastic vulcanizate, a thermoplastic olefin, Teflon, or a combination thereof.

18. The seal of claim 17, wherein the plating reserve comprises one or more fillers, wherein the one or more fillers comprise carbon, graphite, graphene, mica, vermiculite, titanium dioxide (TiO$_2$), molybdenum disulfide (MoS$_2$), tungsten disulfide (WS$_2$), barium sulfate (BaSO$_4$), talc, mica, boron nitride (BN), aromatic polyester, an inorganic filler, or a combination thereof, and wherein the one or more fillers are configured to expand after the polymer wears or decays to fill voids left by the thermally worn or decayed polymer.

19. The seal of claim 5, wherein the inner sealing leg is configured to form a radial seal with a first component of an assembly, and wherein the outer sealing leg is configured to form a radial seal with a second component of an assembly.

20. The seal of claim 1, wherein the valley consists of an opposite, inwardly projecting arcuate convolution with respect to the first sealing lip.

* * * * *